(No Model.)

H. M. VAN KURAN.
GAME APPARATUS.

No. 572,388. Patented Dec. 1, 1896.

WITNESSES:
William P. Gaebel.
Fred Acker.

INVENTOR
Helen M. Van Kuran
BY
ATTORNEYS.

THE NORRIS PETERS CO., PHOTO-LITHO., WASHINGTON, D. C.

UNITED STATES PATENT OFFICE.

HELEN M. VAN KURAN, OF CHICAGO, ILLINOIS.

GAME APPARATUS.

SPECIFICATION forming part of Letters Patent No. 572,388, dated December 1, 1896.

Application filed June 11, 1896. Serial No. 595,117. (No model.)

*To all whom it may concern:*

Be it known that I, HELEN M. VAN KURAN, of Chicago, in the county of Cook and State of Illinois, have invented a new and Improved Game Apparatus, of which the following is a full, clear, and exact description.

My invention relates to a game especially to be played by children and young people; and the object of the invention is to provide a game apparatus which will teach the six colors of the solar spectrum and their tints, and which will also serve to familiarize the players with the names and forms of certain well-known bodies of the solar system, geometrical forms, and representations of animal and plant life.

A further object of the invention is to develop, by means of the game, quickness of perception.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
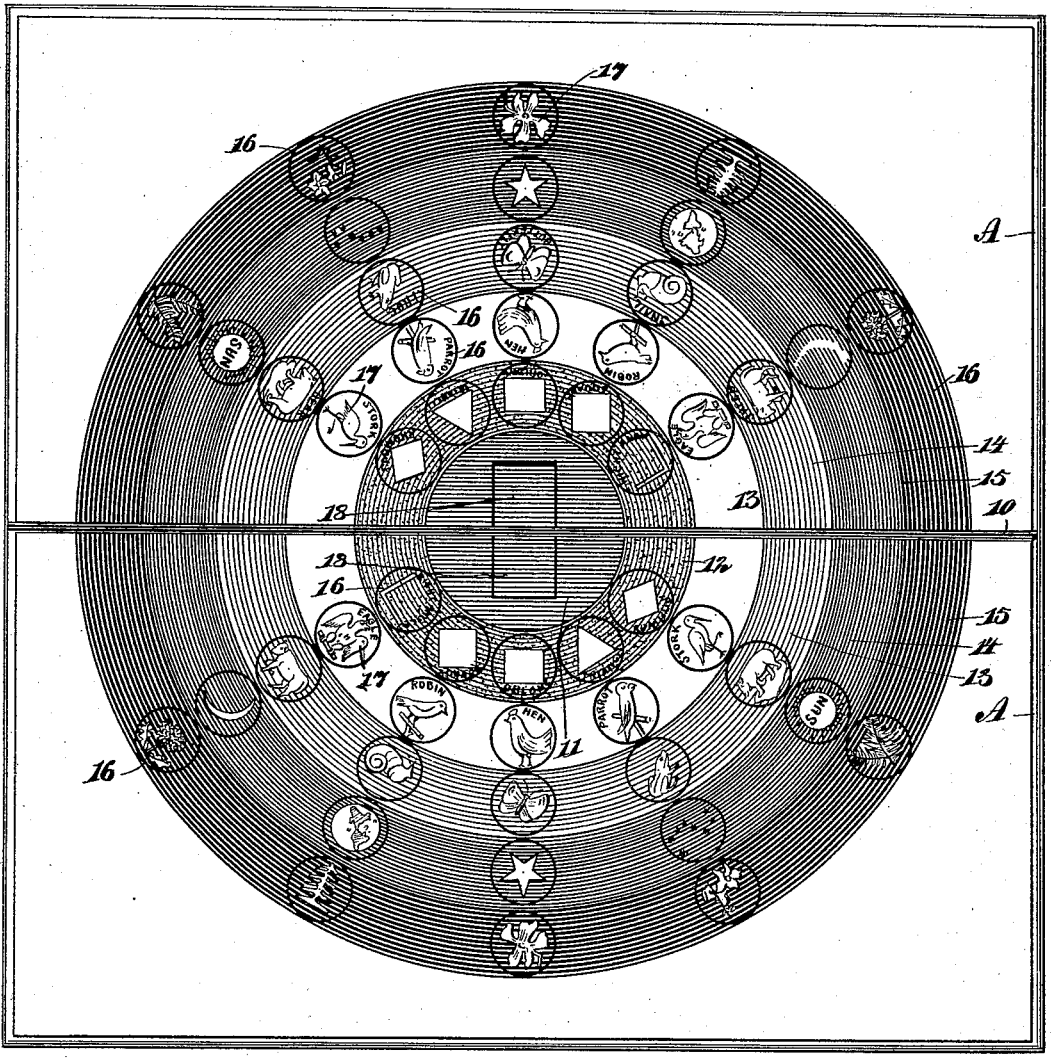
Figure 2:
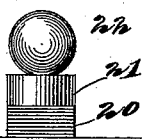
Figure 3:

Figure 1 is a plan view of the game-board. Fig. 2 is an edge view of the board, illustrating a column erected thereon; and Fig. 3 is a plan view of various checkers or movable objects employed in playing the game.

The game-board A is provided with a central line 10, or the said board may be and preferably is provided with a hinge in its center, dividing it into two parts, similar to a folding checker-board. At the center of the board a circle 11 is drawn, and five other concentric circles are drawn at predetermined distances apart around the center circle, the said circles being respectively designated by the reference-numerals 11, 12, 13, 14, and 15, reading from the center. These circles are circles of color and represent the six standard spectrum colors, the central circle being preferably of red, the next of orange, the next of yellow, the next of green, and the two outer circles being blue and violet. Upon each of the color-circles smaller circles 16 are preferably drawn, and the smaller circles of each color-circle are in equal number at each side of the central line 10, and within each of the smaller circles 16 the representation of an object 17 is made, the objects varying in different circles and upon each circle; but upon each color-circle the objects are duplicated at each side of the center line. The center circle at each side of the center line is provided with a square 18, and within the smaller circles of the next section 12 the representations of common geometrical forms are produced. In the smaller circles of the third color-circle 13 the representations of different birds are made, while on the smaller circles of the fourth color-circle 14 animals and insects are represented. Within the smaller circles of the fifth color-circle 15 certain well-known objects of the solar system are produced, and within the smaller circles of the sixth color-circle 16 various plants are represented; but it will be understood that instead of the colors being arranged in circular order they may be placed in other desired order and that the smaller circles may be omitted. Adjacent to each object on the board the name of said object is printed or otherwise produced.

Movable objects 19 are provided, usually in the form of checkers, as shown in Fig. 2, and these checkers correspond in number to the number of objects on the entire board, and each checker bears the representation of an object and the name of the same, corresponding to a certain object on the board. Furthermore, in playing the game a pair of cubes 20, a pair of cylindrical blocks 21, and a single sphere 22 are used. When the game is played by two children, each child uses one-half of the game-board and one set of checkers and center pieces, the latter being the cubes. The checkers are placed upon the edge of the board face side down. It may here be remarked that the checkers which belong to a given belt of standard color are colored with a tint of the said standard color, and that preferably one face of each checker, the under face, for example, is perfectly plain, being simply tinted.

The first player will take up a checker, turn it face side up, and call the name of the object seen upon it. The player who first finds that object on the board will say "I" or otherwise express him or her self and will place the checker upon the object called at his or her side of the board. The other player will then take up a checker in like manner, and so on, playing in alternation until one side of the board is filled. The player who first covers all of the objects on his or her side of the board in any given belt of standard color will place a cube on the square 18 in the central circle of the board. The other player builds his or her center as fast as each large circle is filled, and so each will continue to build the center until the cylindrical block has been placed upon the cube, and the first party who succeeds in covering all of the figures upon one side of the board with corresponding figures will place the single sphere on the column built up in the center, thereby making, when complete, what is known as "Froebel's monument," consisting of a cube, a cylinder, and sphere. It will be understood that any necessary number of cubes and cylinders may be given each player. It is also evident that when the checkers are placed on the board with their plain tinted surfaces up and the board is covered a perfect spectrum of the standard colors and tints for the same will be obtained.

If desired, the rules of the game may be changed to suit the age of the players.

Having thus described my invention, I claim as new and desire to secure by Letters Patent—

1. A game-board having spaces thereon, the said spaces being respectively colored with a different standard color of the spectrum, and movable objects adapted to be placed upon the said spaces, the color of the said movable objects designed for each of the said spaces being that of a tint of the standard color of the space to which they belong, whereby when the movable objects are placed upon the board in their proper positions a spectrum of the standard colors and tints for the same will be obtained, substantially as described.

2. A game-board provided with a series of concentric circles, each bearing a different standard color of the spectrum, and a series of checkers for each of the said concentric circles, the checkers for the respective circles having their faces colored with tints of the standard color of the circle to which they belong, as and for the purpose set forth.

3. A game-board provided with a series of concentric circles bearing the standard colors of the spectrum, checkers having their faces colored with tints of the standard colors of the spectrum, and counters partaking of the shape of cubes, cylinders and a sphere, adapted to be placed in the center circle, as and for the purpose specified.

4. A game-board divided by a central line and having corresponding belts at each side of the dividing-line, bearing the standard colors of the spectrum, each belt having objects produced thereon, duplicated at each side of the aforesaid center line, and checkers corresponding in number to the number of objects on the board and having corresponding objects produced thereon, substantially as shown and described.

5. A game-board divided by a central line and having corresponding belts at each side of the dividing-line, bearing the standard colors of the spectrum, each belt having objects produced thereon, duplicated at each side of the aforesaid center line, and checkers corresponding in number to the number of objects on the board and having corresponding objects produced thereon, the said checkers being colored with tints of the standard colors of the spectrum on the belts to which they belong, as and for the purpose specified.

HELEN M. VAN KURAN.

Witnesses:
CLARENCE C. VAN KURAN,
BLANCHE VAN KURAN.